Patented June 26, 1951

2,558,508

UNITED STATES PATENT OFFICE 2,558,508

THIOPHENE PRODUCTION FROM HYDROGEN SULFIDE AND MONO-OLEFIN

Walter G. Appleby, Houston, and Albin F. Sartor, Pasadena, Tex., assignors to Shell Development Company, San Francisco, Calif., a corporation of Delaware No Drawing. Application June 17, 1946, Serial No. 677,404

2 Claims. (Cl. 260—332.8)

This invention relates to the production of organic sulfur compounds and relates more particularly to the production of unsaturated cyclic organic sulfur compounds of the class consisting of thiophenes.

The unsaturated cyclic sulfur compounds containing the sulfur atom in the ring, such as the thiophenes, are valuable as starting or intermediate materials in the production of a wide variety of products including dyes, pharmaceuticals and many other chemical derivatives. Their production by methods disclosed heretofore, however, is uneconomical and beset with difficulties which mitigate against their practical utilization on a large scale. Methods available heretofore for their synthesis under conditions resulting in the obtaining of a thiophene product of sufficient purity, without the simultaneous production in relatively large quantities of undesired by-products, are generally of so intricate or expensive a nature as to render them economically unattractive. Such methods, furthermore, rely upon the utilization as starting materials of substances not readily available and the manufacture of which often renders subsequent production of the sulfur compounds therefrom highly uneconomical. Further inherent disadvantages of many of these processes is the hazardous nature of the materials used as initial starting material, as well as the poor yields thereby obtained. Other sources of these compounds, available heretofore, include the by-products of processes, the operating conditions of which are directed to the production or processing of materials other than thiophenes as the main product, and consequently are unreliable not only with respect to the amount but the nature and state of purity of the compounds thus obtained.

It was found that thiophenes can be produced with substantially improved efficiency by reacting a mono-olefin with hydrogen sulfide in the presence of a solid catalytic material consisting essentially of alumina, or an aluminous material, under well defined operating conditions as disclosed and claimed in copending application Serial No. 614,616 filed September 5, 1945.

It has now been found that unsaturated cyclic organic sulfur compounds of the class consisting of thiophenes are obtained from readily available mono-olefins and hydrogen sulfide by reacting a mono-olefin with hydrogen sulfide in the presence of a metal sulfide catalyst under the well defined conditions of the present invention. The highly efficient and relatively inexpensive process of the invention not only brings within the realm of practicability the large scale production of thiophenes, but makes possible such large scale production with unusually high yields. Not only can thiophenes be made to predominate in the reaction products obtained while limiting the formation of by-products to substantially only valuable hydrogen and carbon disulfide, but by selection of the particular mono-olefin charged, and control of operating conditions, liquid reaction products are obtained consisting substantially only of thiophenes.

Mono-olefins suitable as starting materials for the process of the invention comprise the normally gaseous and normally liquid unsaturated hydrocarbons having at least two carbon atoms to the molecule and containing a single olefinic bond between two adjacent carbon atoms and containing no other carbon to carbon unsaturation. Suitable mono-olefins comprise for example ethylene, propylene, butylene-1, butylene-2, isobutylene, the amylenes as pentene-1, pentene-2, 2-methyl-butene-3, 2-methyl-butene-1, 2-methyl-butene-2 and the hexylenes as hexene-1, hexene-2, hexene-3, 2-methyl pentene-4, 2-methyl-pentene-3, 3-methyl-pentene-4, 2-methyl-pentene-1, 2-methyl-pentene-2, 3-methyl-pentene-2, 2,3-dimethyl-butene-1 and 2,3-dimethyl-butene-2, the heptylenes, the octylenes, the nonylenes, the decylenes, undecylenes and the like. The mono-olefins may be further substituted by the replacement of one or more of the hydrogen atoms by alkyl, aryl, aralkyl, cycloalkyl, or heterocylic groups, as well as halogens. The particular mono-olefins chosen as charge material will of course be governed by the nature of the product desired. The hydrocarbon charge need not necessarily consist of a single mono-olefin, and two or more mono-olefins may be comprised in the charge to the process. The hydrocarbon charge may comprise materials other than the mono-olefins, capable of acting as diluents, temperature or flow controlling means, etc. Such materials which may be included in the hydrocarbon charge comprise gases and vapors having no adverse effect upon the execution of the desired reaction, such as, for example, normally gaseous and normally liquid saturated hydrocarbons, nitrogen, hydrogen, carbon dioxide and the like. Suitable charge material comprises hydrocarbon mixtures or fractions containing substantial amounts of the mono-olefins, such as, for example, the ethylene, propylene, butylene, amylene in fractions obtained by fractionation of naturally occurring hydrocarbon mixtures or of products of refinery operations. Waste or off-gases, rich in mono-olefins, from many petroleum refinery operations are particularly desirable starting materials for the process of the invention.

The hydrogen sulfide to be reacted with the mono-olefin charge is introduced into the system in admixture with the mono-olefins; or it may be introduced in part, or in its entirety, in a separate stream to the inlet or any intermediate point or points of the reaction zone. The ratio of hydrogen sulfide to mono-olefins charged may vary within the scope of the invention. It is preferred, however, to add sufficient hydrogen sulfide to maintain a mole ratio of hydrogen sulfide to mono-olefins in the charge of at least 1:1 and not substantially in excess of about 10:1. Still more preferably the mole ratio of hydrogen sulfide to mono-olefins is maintained in the range of from about 2:1 to about 6:1. Optimum results are obtained by maintaining the mole ratio of hydrogen sulfide to mono-olefins at about 3:1 to 4:1, particularly when utilizing normally gaseous mono-olefins as the hydrocarbon charge. Higher ratios of hydrogen sulfide may, however, be employed within the scope of the invention.

The hydrogen sulfide charged to the reaction need not necessarily be pure hydrogen sulfide and may comprise any suitable hydrogen sulfide-containing gas or vapor, the components other than the hydrogen sulfide of which have no substantial deleterious effect upon the execution of the reaction. Thus the hydrogen sulfide may be employed in the form of a gaseous mixture comprising the hydrogen sulfide in admixture with a gas or vapor such as, for example, hydrogen, nitrogen, normally gaseous paraffins, etc. The gaseous component of the hydrogen sulfide mixture may function to aid in maintaining the hydrogen sulfide within the prescribed concentration as well as to control conditions of temperature, time of contact, etc.

In accordance with the process of the invention the mono-olefins, for example the normally gaseous mono-olefins, such as the butylenes, are reacted with hydrogen sulfide in the presence of a suitable metal sulfide catalyst. Suitable metal sulfide catalysts comprise the sulfides of the metals of the iron group, that is, those comprising a sulfide of at least one of the metals of the group consisting of iron, cobalt and nickel. Although the sulfides of the iron group metals may be employed as such, particularly desirable catalysts comprise those containing the sulfide of at least one member of the iron group metals in combination with at least one of the metals of the left-hand column of group VI of the periodic table consisting of chromium, molybdenum, tungsten and uranium. Of these combination catalysts those containing at least the greater part of the component consisting of the metal or metals of group VI in the form of a sulfide or an oxide or in a mixture thereof are particularly preferred. The combination of the group VI metals with the sulfides of the iron group, it has been found, obviates many of the disadvantages normally interent in the use of the iron group sulfides by themselves such as an undue degree of catalyst entrainment, lack of catalyst stability, as well as insufficient physical strength to withstand handling without substantial attrition. These catalyst combinations not only possess unusual stability and strength, but are highly effective in catalyzing the interaction of the mono-olefins with hydrogen sulfide under the conditions defined herein with the formation of unsaturated sulfur-containing compounds consisting predominantly and often substantially completely of thiophenes. The use of the defined combination catalysts in the process of the invention is therefore particularly advantageous in view of the relatively high yield of thiophenes obtainable during prolonged periods of continuous operation. The proportions in which the sulfide of the metal or metals of the iron group are combined with the sulfur and/or oxide of the metal, or metals, of the left-hand column of group VI of the periodic table, may vary widely within the scope of the invention. It is to be stressed, however, that the metals of group VI, by themselves, generally possess little if any ability to promote or catalyze to any practical degree the formation of thiophenes from mono-olefins and hydrogen sulfide under the condition of the present invention, and that their function in the process of the invention, such as for example the obtaining of extremely long catalyst life with a relatively constant high yield is obtainable only when they are employed in combination with a sulfide of a metal of the iron group. The combination catalysts may contain the sulfides and/or oxides of the metals of the left-hand column of group VI in such amounts that the metal of group VI in the combination catalyst is in the range of from about 0.5 to about 75% by weight of the combined weights of the group VI and iron group metals in the catalyst.

The above-defined catalysts employed in the process of the invention, comprising the sulfide of the iron group metals alone and those containing these sulfides in combination with at least one metal of the left-hand column of group VI of the periodic table, are promoted by the addition thereto of a member of the group consisting of the alkali and alkaline earth metals or compounds thereof. Particularly desirable promoters are oxides of the alkali or alkaline earth metals, for example, $K_2O$, $Na_2O$, $BaO$, $SrO$, $Li_2O$, $CaO$ and the sulfides of these metals. Of these promoters the compounds, and particularly the oxide, of potassium are somewhat preferred. The promoters are preferably added in such amounts that the ratio of alkali or alkaline earth metal constitutes from about one-half to about 10 percent, and still more preferably from about 2 to about 7 percent by weight of the metal, or metals, of the iron group present in the catalyst.

The invention is in no wise limited by the method of preparation of the catalyst and it may be prepared in any suitable manner. The combination catalysts may be prepared by the simple expedient of effecting the admixture of the several components. Thus suitable combination catalysts may be prepared by admixing in finely divided form the sulfides of the iron group metals with the proper proportion of the oxides and/or sulfides of the group VI metals; or the members of the two respective component groups of the catalyst may be combined while one, or both, is in solution or suspension in a suitable liquid, the excess liquid removed by filtration and/or evaporation and the resulting mixture dried at an elevated temperature. When a promoter catalyst is employed it may be incorporated into the catalyst by initial additional to one or more of the catalyst components, or to a mixture of the components during any stage of catalyst preparation. Catalysts possessing a high degree of efficiency in the process of the invention are obtained by combining all of the metal components in the form of oxides and thereafter subjecting the resulting mixed oxides to a sulfiding operation to effect the conversion of at least a substantial part of the iron group metal to the sulfide. The sulfiding operation may be executed under any suitable conditions assuring the conversion of at least a substantial part of the iron group metal to the sulfide. The extent to which any part of the oxide of the group VI metal will be converted to the sulfide during the sulfiding operation will of course depend upon the nature of the particular oxide and group VI metal present, as well as the severity of the sulfiding operation. As stated above, the group VI metal component of the catalyst may be present as either the oxide or the sulfide, or a mixture thereof. In preparing catalyst for use in the process of the invention by sulfiding the mixed oxides, excellent results are obtained by effecting the sulfiding operation under conditions leading to the conversion of at least a substantial part of the oxide of the iron group metal to the sulfide while leaving at least a part of the group VI metal in the form of the oxide. Because of the difficulty if not impossibility in correctly determining the exact composition of a catalyst mixture obtained in this wise, these combination catalysts obtained by sulfiding the mixed oxides are referred to herein as "sulfided" oxide catalyst. By the term "sulfiding" as used throughout the specification and claims is meant the subjection of the catalyst to a sulfur-containing atmosphere under conditions effecting the conversion of at least a part of the catalyst components to the sulfide form. Suitable sulfiding conditions comprise the exposure of the catalyst to a stream of a sulfur-containing gas, such as for example, hydrogen sulfide, or a hydrogen sulfide-containing gas, at an elevated temperature. Suitable sulfiding temperatures comprise a temperature in the range of from about 500° C. to about 850° C., and preferably from about 550° C. to about 650° C. The hydrogen sulfide may be diluted with a suitable inert gas such as for example nitrogen. The following example is illustrative of one method of preparing a sulfided metal oxide catalyst effective in the process of the invention.

*Example I*

A mixture containing iron oxide, chromium oxide and potassium oxide in the ratio of 89:2½:9.8 parts by weight, respectively, was prepared by mixing in the proper proportions finely divided $Fe_2O_3$ and $Cr_2O_3$ and adding thereto aqueous potassium carbonate to form a paste. The paste thus obtained was dried and heated at a temperature of about 600° C. to effect the decomposition of the potassium carbonate to the oxide. The resulting mixture of oxides was thereupon sulfided by heating in a stream of hydrogen sulfide at a temperature of about 600° C. to effect the conversion of at least a substantial part of the iron oxide to the iron sulfide.

The efficiency of the sulfided metal oxide catalysts above defined in the production of thiophenes in accordance with the process of the invention is evidenced by the following example.

*Example II*

A mixture of 1-butylene and hydrogen sulfide containing a mole ratio of hydrogen sulfide to butylene of 4:1 was passed over a sulfided catalyst consisting of potassium promoted iron sulfide in combination with chromium oxide at a temperature of 600° C., atmospheric pressure, and a contact time of 15 seconds. The catalyst used was obtained as described in Example I by heating a mixture containing iron oxide, chromium oxide and potassium oxide in the ratio of 90:5:5 parts by weight, respectively, in a stream of hydrogen sulfide at a temperature of about 600° C. Effluence from the reactor was passed successively through a water cooled condenser, two cold traps maintained at —50° C. to —60° C. and three caustic scrubbers. A conversion to thiophene based on butylene charged of about 13 percent was obtained to give a liquid product consisting of 82 percent by volume of thiophene and 18 percent by volume of carbon disulfide. No perceptible amount of mercaptans was evidenced in the reaction products.

Catalysts, particularly catalysts of the sulfided metal oxide type effective in the catalytic production of thiophenes in accordance with the process of the invention are also obtained by the method comprising the steps of coprecipitating the metals of the iron group together with the metals of group VI, subjecting the resulting precipitate to conditions effecting the conversions of the metal to the oxide form, as by heating at an elevated temperature, if necessary, in the presence of an oxygen-containing gas, and sulfiding the mixture of oxides thus obtained. Sulfided catalysts containing potassium-promoted iron and chromium of high efficiency in the process of the invention are obtained by coprecipitating iron and chromium from a mixed solution of iron sulfate and chromium nitrate with ammonium hydroxide, washing the precipitate with potassium nitrate solution, drying the precipitate at a temperature of from about 100° C. to about 120° C. and heating the dried precipitate at a temperature of about 750° C. to effect the conversion of the metals to the oxides. The resulting mixture of oxides is then subjected to sulfiding conditions in the presence of hydrogen sulfide at a temperature of about 600° C. to effect the conversion of at least a substantial part of the iron oxide to the sulfide.

Suitable catalysts for use in the process of the invention which contain at least a substantial part of both the iron group metal and the group VI metal in the sulfided state include those, for example, wherein the metals of the iron group as well as those of group VI are prepared under conditions involving the precipitation of the metal of the iron group in the sulfide form in the presence of sulfur compounds of the metals of the left hand column of group VI. Such methods of preparing these metal sulfide combination catalysts are exemplified by the following example.

*Example III*

To an ammonium thiotungstate solution, prepared from an ammoniacal aqueous tungstic acid solution with hydrogen sulfide, there is added an aqueous solution of nickel nitrate. A precipitate consisting largely of nickel sulfide is formed. Dilute sulfuric acid is added until the hydrogen ion concentration of the resulting mixture, in terms of pH values, is in the range of from about 1 to about 2. Tungsten is thereby precipitated as tungsten trisulfide. The precipitate is separated from the liquor by filtration and/or centrifuging. The resulting tungsten-nickel sulfides are dried and calcined at a temperature of from about 400° C. to about 425° C. in a hydrogen atmosphere, thereby effecting the conversion of tungsten trisulfide to tungsten disulfide.

The high yield of thiophene obtained in accordance with the process of the invention executed with a metal sulfide combination catalyst prepared by initial precipitation of the metal components as described above is illustrated by the following example.

*Example IV*

A mixture of normal butylene and hydrogen sulfide containing a mole ratio of hydrogen sulfide to butylene of 4:1 was passed over a nickel-tungsten sulfide catalyst at a temperature of about 600° C., atmospheric pressure, and a contact time of 15 seconds. The catalyst employed was prepared substantially as described in Example III and contained a weight ratio of nickel to tungsten of 1:2.24. Effluence from the reactor was passed successively through a water cooled condenser, two cold traps maintained at −50° C. to −60° C. and three caustic scrubbers. A conversion to thiophene based on butylene charged of 16 percent was obtained to give a liquid product consisting a 48 percent by volume of thiophene and 52 percent by volume of carbon disulfide. No perceptible amount of mercaptans was evidenced in the reaction products.

The catalyst employed in the process of the invention may furthermore be used in admixture with solid diluent materials. Such diluent materials comprise, for example, crushed firebrick, crushed silica, silica stone, charcoal, pumice, crushed sandstone, marble, majolica chips, ceramic bodies, porous aggregates as well as certain naturally occurring minerals as magnesite, brucite, and the like. Particularly desirable diluent or support materials comprise the highly porous materials possessing adsorptive properties such as, for example, adsorptive aluminas or siliceous materials, the various adsorptive aluminas, the "Activated Alumina" of commerce, bauxite, adsorptive magnesia and the like. The use of a support or diluent material is preferably resorted to when employing the catalysts consisting essentially or predominantly of only the sulfides of the metals of the iron group. The support material may be combined with the catalyst in any suitable manner. It may be combined with the catalyst by simple admixture or the metal sulfide may be deposited or formed upon the support material. Preparation of suitable catalysts comprising a sulfide of a metal of the iron group in combination with an adsorptive material is exemplified by the following example.

*Example V*

A catalyst consisting of iron sulfide and activated alumina was prepared by impregnating an adsorptive alumina with a sufficient amount of aqueous iron nitrate, Fe(No3)3, to result in a mixture containing iron in an amount of about 7 percent by weight of the adsorptive alumina present. The resulting mixture was dried at a temperature of 130° C. and calcined at 400° C. The resulting calcined mixture was then heated at a temperature of about 600° C. in a stream of hydrogen sulfide for a period of about two hours to convert the iron to the sulfided form.

The effectiveness of the catalysts, comprising only the sulfide of the metals of the iron group, in catalyzing the interaction of hydrogen sulfide and mono-olefins with the production of a thiophene reaction product is evidenced by the following example:

*Example VI*

A mixture of normal butylene and hydrogen sulfide containing a mole ratio of hydrogen sulfide to butylene of 4:1 was passed over a catalyst consisting of iron in the sulfided form deposited upon adsorptive alumina, at a temperature of 600° C., atmosphere pressure, and a contact time of 15 seconds. The catalyst was prepared as described in Example V and had an iron content of about 7 percent by weight. A conversion to thiophene, based upon butylene charged, of 31.4 percent was obtained to give a liquid product consisting of 94 percent by volume of thiophene and 6 per cent by volume of carbon disulfide. No perceptible amount of mercaptans was evidenced in the reaction product.

A critical factor in the execution of the process of the invention resides in the temperature employed. Thus the temperature of reaction is maintained above about 550° C. and preferably not substantially above 800° C. At lower temperatures the formation of reaction products predominating in sulfur compounds other than the desired thiophenes is generally favored. Temperatures above 800° C. are generally deleterious to catalyst activity as well as the yields obtained. It is preferred to maintain the temperature in a range of from about 575° C. to about 675° C. Still more preferred, particularly when charging normally gaseous mono-olefins, for example, normally gaseous hydrocarbons comprising a butylene, is a temperature of about 600° C. Under the above defined temperature conditions, excellent results are obtained utilizing contact times ranging from about 5 seconds to about 60 seconds. A contact time of from about 10 to 30 seconds is preferred. Contact times of lesser or longer duration may however be resorted to within the scope of the invention.

The process of the invention is carried out at subatmospheric, atmospheric or superatmospheric pressures. It is preferred, however, to maintain the pressure below the combined vapor pressures of the constituents of the reaction mixture. The use of a pressure in the range, for example, of from about atmospheric pressure to about 500 pounds per square inch absolute is particularly preferred.

Under the above-defined conditions excellent conversions of mono-olefins to thiophenes are obtained with long catalyst life. Thus the reaction of butylene with hydrogen sulfide under these conditions will result in the production of a liquid product consisting essentially only of thiophene. Contrary to results obtainable utilizing processes disclosed heretofore, the final products of the invention are substantially free of mercaptans.

The process of the invention is executed in any suitable type of apparatus enabling efficient contact of reactants with the catalyst. Hydrogen sulfide and unreacted hydrocarbons are separated from the reactor effluence by any suitable means and recycled to the reaction zone. Product separation may comprise such steps as, for example, solvent extraction, distillation, extractive disillation, adsorption and the like.

The process of the invention is executed in batch, semi-continuous or continuous operation.

The reaction zone may include a plurality of separate reactors connected in series or in parallel. When a plurality of reactors connected in series are employed, all or a part of the reaction products may be separated from reactor effluence prior to introduction of the stream into the subsequent reactor of the series. Conditions within the reactors may be controlled to favor the production of thiophene in all of the reactors or they may be controlled to favor the production of hydrogen in one or more of the reactors.

The catalysts employed in the process of the invention may be subjected prior to use, or between on-stream periods, to a flushing operation with a suitable gaseous material, such as for example nitrogen, hydrogen, saturated hydrocarbons or the like, followed by a sweeping with hydrogen sulfide, or a hydrogen sulfide-containing gas. This pretreatment is preferably executed at an elevated temperature in the range of, for example, from about 400 to 750° C., and preferably in the range of from about 550 to about 650° C. The catalysts of the invention maintain their activity over prolonged periods of time under the conditions of operation of the process. When activity falls below that commensurate with practical or optimum operating conditions, the catalysts are subjected to a suitable regeneration treatment. Suitable regeneration conditions comprise such steps as the sweeping of the catalyst with an inert gas such as nitrogen, followed by passage therethrough of oxygen or an oxygen-containing gas. The regeneration is preferably effected at an elevated temperature preferably in the range outlined as suitable pretreating temperatures. The resulting regenerated catalysts are preferably pretreated prior to use as described above. The invention is, however, not limited to any particular method employed in the pretreatment and/or regeneration of the catalysts.

We claim as our invention:

1. The process for the production of thiophene which consists of contacting a mixture of butylene and hydrogen sulfide containing a molar ratio of hydrogen sulfide to butylene of from about 2:1 to about 6:1 with iron sulfide at a temperature of about 550° to about 800° C. in a reaction zone for a time between 10 and 30 seconds, thereby reacting hydrogen sulfide with butylene with the formation of thiophene in said reaction zone, separating thiophene and unconverted hydrogen sulfide from the resulting reaction products and recycling said unconverted hydrogen sulfide to said reaction zone.

2. The process for the production of a thiophene which consists of contacting a mixture of hydrogen sulfide and a normally gaseous mono-olefin containing a molar ratio of hydrogen sulfide to olefin of from about 2:1 to about 6:1 with iron sulfide at a temperature of about 550° to about 800° C. in a reaction zone for a time between 10 and 30 seconds, thereby reacting hydrogen sulfide with said olefin with the formation of thiophene in said reaction zone, separating thiophene and unconverted hydrogen sulfide from the resulting reaction products and recycling said unconverted hydrogen sulfide to said reaction zone.

WALTER G. APPLEBY.
ALBIN F. SARTOR.

REFERENCES CITED

The following references are of record in the file of this patent:

UNITED STATES PATENTS

| Number | Name | Date |
|---|---|---|
| 1,085,708 | Steinkopf | Feb. 3, 1914 |
| 1,907,274 | Wheeler | May 2, 1933 |
| 2,315,107 | Chickinoff | Mar. 30, 1943 |
| 2,336,916 | Arnold | Dec. 14, 1943 |
| 2,369,377 | Thacker | Feb. 13, 1945 |
| 2,428,727 | Thacker | Oct. 7, 1947 |
| 2,474,440 | Smith | June 28, 1949 |

OTHER REFERENCES

Duffey, Ind. Eng. Chem., 26, 91–92 (1934).
Maihle, Chimie & Industrie, 31, 257 (1934).